(12) United States Patent
Reeves et al.

(10) Patent No.: US 6,959,912 B2
(45) Date of Patent: Nov. 1, 2005

(54) INJECTABLE PACKING UNIT IN A SINGLE KNIFE GATE BODY

(75) Inventors: Shaine G. Reeves, Amory, MS (US); Christopher A. Vanderberg, Amory, MS (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 249 days.

(21) Appl. No.: 10/425,226

(22) Filed: Apr. 29, 2003

(65) Prior Publication Data

US 2004/0217319 A1 Nov. 4, 2004

(51) Int. Cl.$^7$ ............................................. F16K 31/44
(52) U.S. Cl. ...................................... 251/214; 251/327
(58) Field of Search ................................ 251/214, 326, 251/327, 329; 277/510, 512, 516, 520

(56) References Cited

U.S. PATENT DOCUMENTS

| | | | |
|---|---|---|---|
| 4,009,727 A | 3/1977 | Bailey | |
| 4,026,517 A | 5/1977 | Still | |
| RE29,679 E | 6/1978 | Boitnott | |
| 4,230,299 A | 10/1980 | Pierce, Jr. | |
| 4,364,542 A | 12/1982 | Meyer | |
| 4,429,710 A | 2/1984 | Grieves et al. | |
| 4,451,047 A | 5/1984 | Herd et al. | |
| 4,516,752 A | 5/1985 | Babbitt et al. | |
| 4,552,369 A | 11/1985 | Stewart et al. | |
| 4,583,569 A | 4/1986 | Ahlstone | |
| 4,603,864 A | 8/1986 | Raftis | |
| 4,646,407 A | 3/1987 | Mayhew, Jr. | |
| 4,679,770 A | 7/1987 | Liberman | |
| 4,703,915 A | 11/1987 | King | |
| 4,765,361 A | 8/1988 | Clifford | |
| 4,881,719 A | 11/1989 | Bowman | |
| 4,895,181 A | 1/1990 | McKavanagh | |
| 5,056,758 A | 10/1991 | Bramblet | |
| 5,062,439 A | 11/1991 | Butler et al. | |
| 5,082,247 A | 1/1992 | Owens et al. | |
| 5,137,261 A | 8/1992 | Clifford | |
| 5,178,180 A | 1/1993 | Parris et al. | |
| 5,197,512 A | 3/1993 | Lev | |
| 5,205,317 A | 4/1993 | Neuerberg et al. | |
| 5,244,183 A | 9/1993 | Calvin et al. | |
| 5,271,426 A | 12/1993 | Clarkson et al. | |
| 5,295,661 A | 3/1994 | Roussel | |
| 5,338,006 A | 8/1994 | McCutcheon et al. | |
| RE35,116 E | 12/1995 | Butler et al. | |
| 5,653,423 A | 8/1997 | Young et al. | |

(Continued)

FOREIGN PATENT DOCUMENTS

GB 2 340 916 A 3/2000

Primary Examiner—Edward K. Look
Assistant Examiner—John K. Fristoe, Jr.
(74) Attorney, Agent, or Firm—RatnerPrestia

(57) ABSTRACT

A knife gate valve is provided, comprising: a unitary valve body having a flow channel extending there through, a guide segment and a stuffing box. A knife gate is located in the guide segment, the stuffing box and the flow channel and is slideable between an open and closed position. Lateral seals are provided in the stuffing box and can be replaced while the valve body is connected in its associated fluid system. These seals include an injectable sealing material contained in the stuffing box. A knife gate seat is provided in the valve body for sealing the knife gate and it can be replaced without completely removing the valve body from its associated fluid system.

10 Claims, 3 Drawing Sheets

U.S. PATENT DOCUMENTS

| | | |
|---|---|---|
| 5,890,700 A | 4/1999 | Clarkson et al. |
| 5,908,044 A | 6/1999 | Kearns et al. |
| 5,908,046 A * | 6/1999 | Mosman ................... 137/312 |
| 5,979,874 A | 11/1999 | Gambetta et al. |
| 6,116,573 A | 9/2000 | Cornette et al. |
| 6,279,875 B1 | 8/2001 | Chatufale |
| 6,422,535 B1 | 7/2002 | Stone et al. |
| 6,588,729 B1 | 7/2003 | Kimpel |

* cited by examiner

INJECTABLE PACKING UNIT IN A SINGLE KNIFE GATE BODY

FIELD OF THE INVENTION

This invention related to generally to a knife gate valve, and more particularly to a knife gate valve having a unitary body and sealing arrangement that facilitates seal maintenance.

BACKGROUND OF THE INVENTION

Knife gate valves are used in a variety of applications for quickly shutting off the flow of fluid or other media in a piping system. Typically, knife gate valves have a pair of body members, each formed with a flow passage, fastened together to form a valve body. The body members are spaced apart to provide a seat that accommodates a knife gate when it (the knife gate) is in its closed position, i.e., is operative to shut off flow. Each body member is also formed with an extension and these extensions are also spaced apart to form a housing that accommodates the knife gate in its open position. A knife gate seat arrangement is provided around the flow passages to sealingly engage the knife gate in its closed position and a stuffing box seal arrangement is provided in the housing to sealingly engage the knife gate in both its open and closed positions.

In some of these gate valves, an injectable packing is used to adjust the stuffing box seal as it wears. However, the spacing between the body members provides undesirable leakage paths.

Moreover, in these typical arrangements, routine maintenance is a time consuming and expensive process. Replacement of seals and packing materials requires the removal of the valve from its associated piping system, disassembly and reassembly of the valve and installation in its piping system.

SUMMARY OF THE INVENTION

This invention is, according to one aspect, a knife gate valve arranged to facilitate the refurbishment of its stuffing box seals without removing the valve from its associated pipe line.

A knife gate valve according to this invention comprises a unitary valve body formed with: a flow channel extending therethrough; a knife gate slot that communicates with the flow channel; a stuffing box adjacent the knife gate slot and communicating therewith; and, an injection port communicating with the stuffing box. A knife gate is slideably carried in the knife gate slot and the stuffing box for movement between an open position and a closed position extending across and closing the flow channel. A stuffing box seal is carried in the stuffing box and it includes an injectable sealing material injectable into the stuffing box through the injection port.

In accordance with a different feature of the invention, a knife gate valve according to this invention comprises a unitary valve body formed with a flow channel, a groove formed in and open to the flow channel, a knife gate seal carried in the groove and a knife gate carried in the valve body for movement between an open position and a closed position where in the knife gate seats against the seal to prevent leakage. Port liner guides are carried by the valve body and extend from the open end of the flow channel to the groove. Each port liner guide is formed with a rib at its inner end adjacent the groove and, thus, the knife gate. The distance between the ribs is just slightly larger than the thickness of the knife gate so that the ribs guide the movement of the knife gate between its open and closed positions and minimize movement under flow considtions when the knife gate is in its closed position.

Both the foregoing general description and the following detailed description of a preferred embodiment of the invention are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing may not be to scale. Included in the drawing are the following figures.

DETAILED DESCRIPTION OF THE INVENTION

Figure 1:
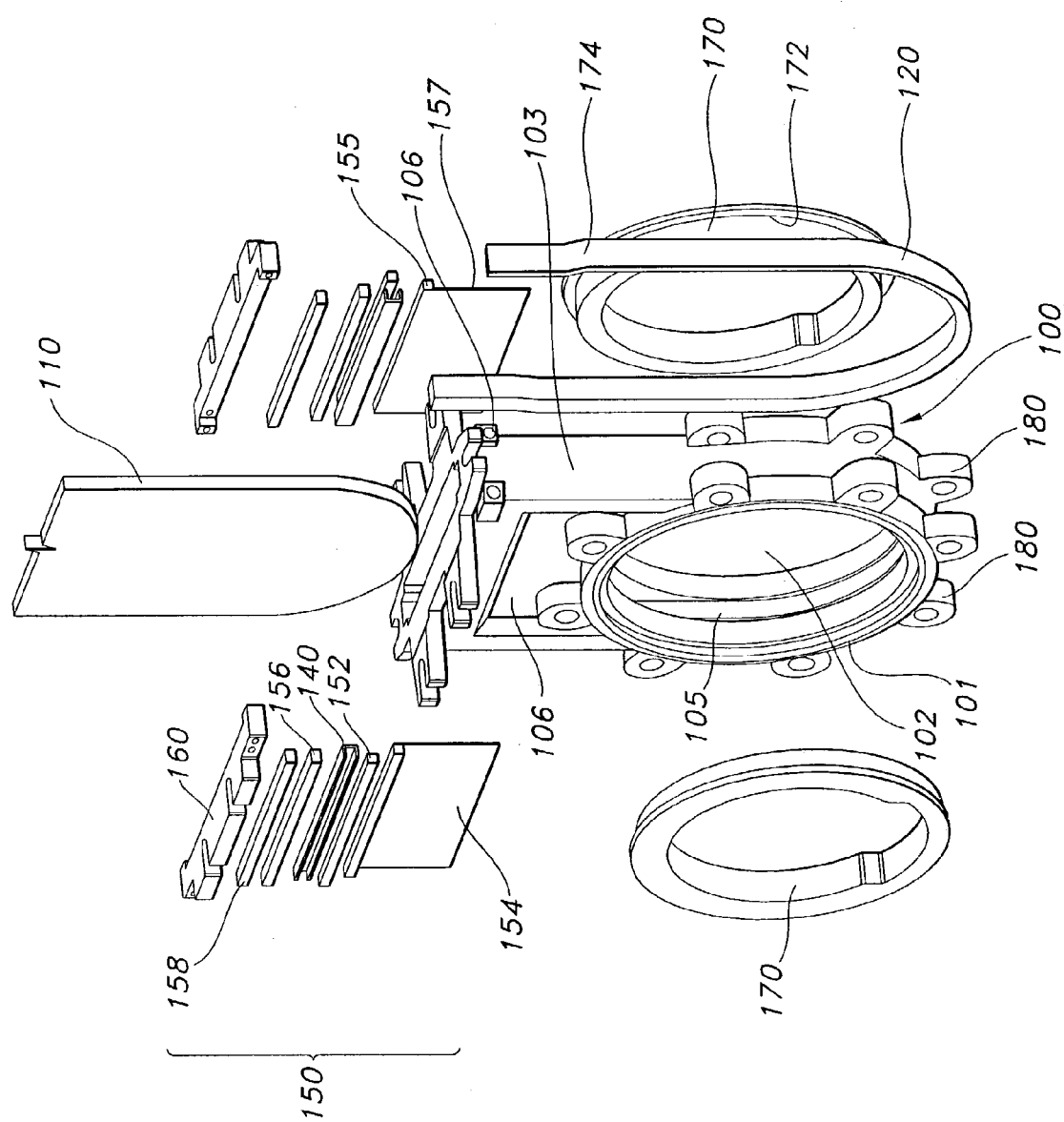
FIG. 1 is an exploded view of a knife gate valve according to a preferred embodiment of the invention.
Figure 2:
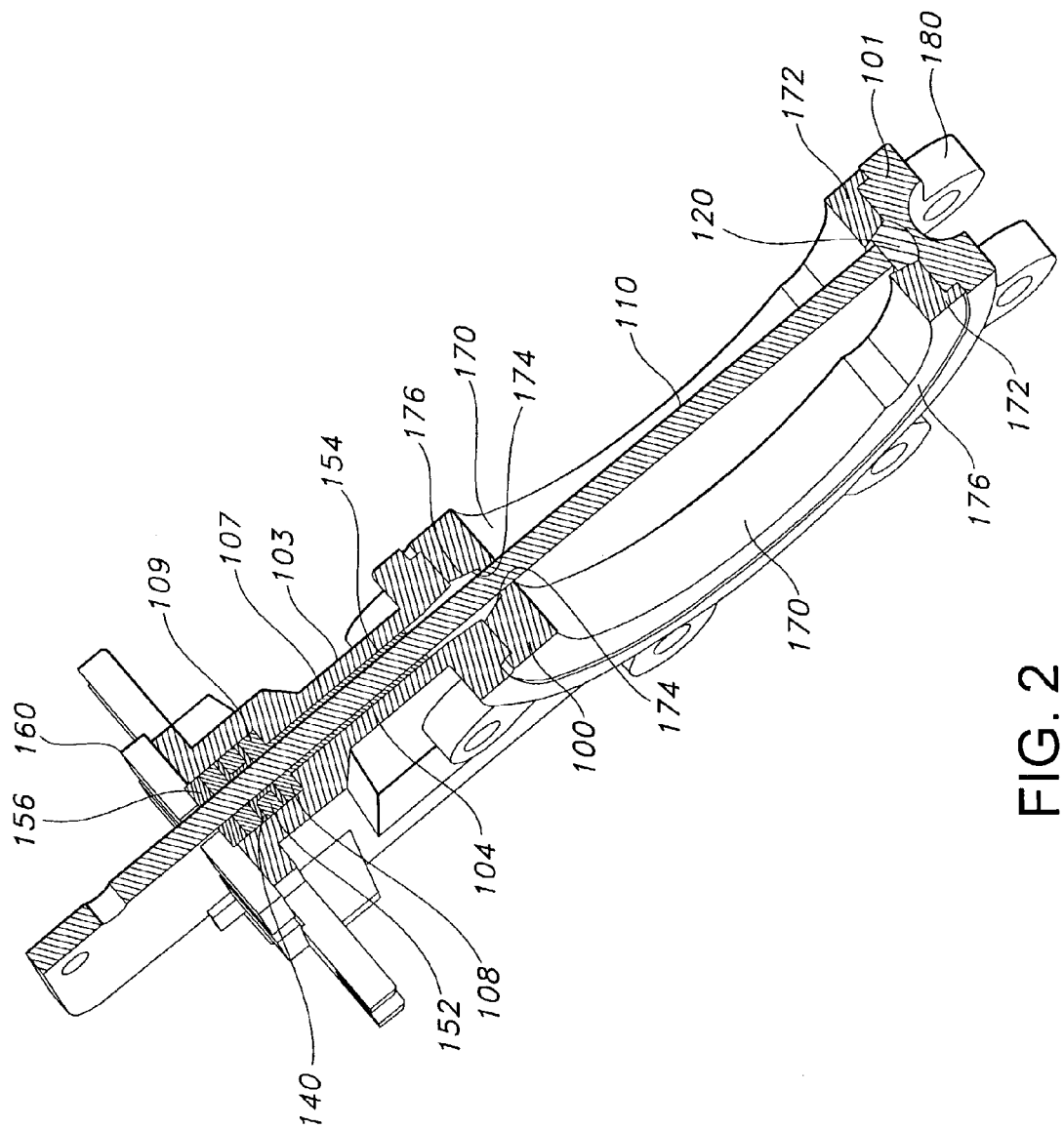
FIG. 2 is a perspective view, in section, of the knife gate valve of FIG. 1 taken generally along its longitudinal axis and showing the knife gate in the closed position.
Figure 3:
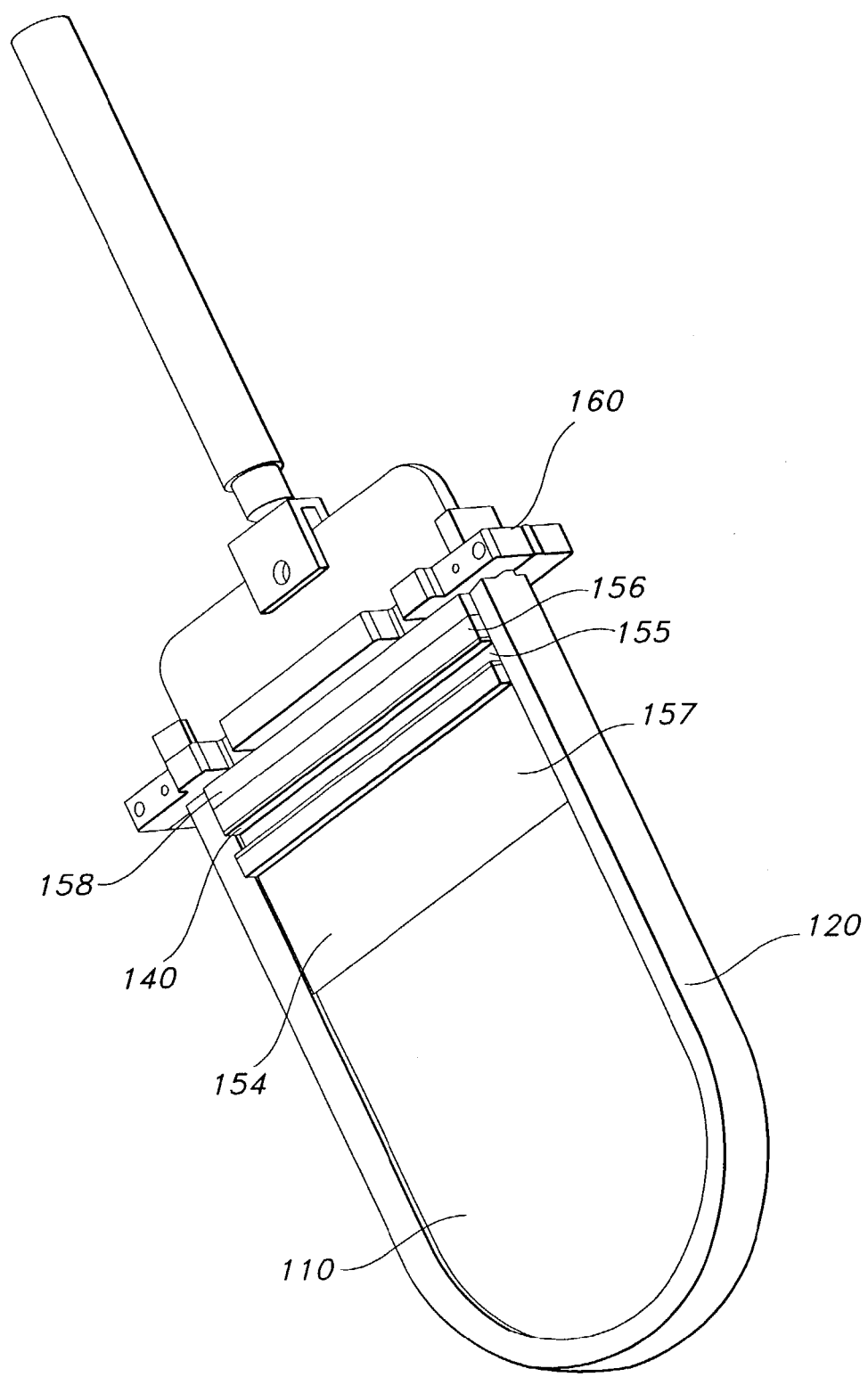
FIG. 3 is an enlarged isometric view of the knife gate and seal arrangement shown in FIG. 1.

Referring now to the drawing, FIGS. 1 and 2 show a knife gate valve having a unitary valve body 100, a knife gate 110, a stuffing box seal 150 and a knife gate seat 120.

The valve body 100 is a unitary piece having a generally cylindrical portion 101 and a generally rectangular (in plain view) box portion 103 extending from the outer periphery of the cylindrical portion. The cylindrical portion 101 includes a flow channel 102 in the form of an opening extending axially from one outer surface to the other. The circular inner wall of the cylindrical portion 101 that bounds the flow channel 102 is formed with a groove 105 that accommodates the knife gate seat 120 for sealing the knife gate 110 in its closed position, i.e., when the knife gate sits in the cylindrical portion and blocks the flow channel.

The valve body 100 has integral flanges 180 around its outer periphery at each end of the flow channel 102. Flanges 180 mate with flanges formed on a mating vessel (pipe, chamber or the like) and the mating flanges are connected, with any suitable fastener arrangement to couple the valve to its mating vessel.

As best seen in FIG. 2, the box portion 103 is formed with a slot 104 extending from the flow channel toward and terminating at the free end of the box portion. The slot 104 includes a guide segment 107 adjacent the cylindrical portion 101 and it communicates with the flow path 102 adjacent the groove 105. In the guide segment 107 the distance between the walls transverse to the direction of flow generally corresponds to the thickness of the knife gate 110 so that the gate is slideably received in the slot.

The slot 104 also includes an enlarged segment that extends from the free end of the box portion 103 to the guide segment 107. The distance between the walls in the box portion that are transverse to the direction of flow is greater than the distance between the transverse walls in the guide segment 107. This enlarged slot segment provides a stuffing box 108 in which the knife gate 110 is also slideably received. As will be described hereinafter, the stuffing box 108 contains the packing seal 150 that sealingly engages the knife gate 110 to prevent fluid in the flow channel 102 from leaking through the guide segment 107 and stuffing box 108.

The valve body 100 is a unitary piece, preferably a single casting that is machined where required to provide the critical dimensions and surface finishes usual in knife gate valve bodies. Depending on the media it is controlling, the valve body 100 may be made of ductile iron, carbon steel, stainless steel or other material suitable for the media being controlled.

The stuffing box seal 150 comprises a pair of seal assemblies, one on each side of the knife gate 110, and each seal assembly sits on a shoulder 109 formed at the interface of the guide segment 107 and the stuffing box 108. Each packing seal 150 includes a lateral seal 140 disposed adjacent the knife gate 110 and it extends along the length of the transverse wall in the stuffing box in sealing engagement with the knife gate. Lateral seals 140 are each formed with a concave surface that is adjacent its associated transverse wall in the stuffing box 108 to form a concavity that communicates with injection ports 106. The opposite or convex surfaces of each lateral seal 140 engage the knife gate 110. Lateral seals 140 may comprise an elastomer such as natural rubber, EDPM®, AFLAS®, VITON®, or the like.

Injectable sealing material 152 is injected through the injection ports 106 into the concavity between the concave surface of the lateral seal 140 and its associated transverse wall in the stuffing box 108. The injectable sealing material may be, for example, a tacky fibrous flowable material that fills the concavity and forms a pressure-tight seal against the stuffing box walls. If needed, a square braided packing 156 may be disposed above, below or both above and below lateral seals 140 to provide additional sealing and solid inserts 158 may be provided above, below, or both above and below the braided packing 156 to maintain the position of these seals relative to the injection ports 106.

A packing retainer 160 is placed over and closes the open end of the stuffing box 108 and is attached to body 100 by threaded fasteners or other suitable fasteners. Stuffing box seal 150 is compressed between the packing retainer 160 and shoulders 109 to maintain a pressure tight seal between the walls of stuffing box 108 and packing seal 150 and between knife gate 110 and packing seal 150.

Optionally, a chest liner 154 may be disposed at the bottom of packing seal 150 in contact with each shoulder 109. Each chest liner 154 comprises a rectangular flange 155 resting on the full length of its associated shoulder 109 and further comprises a liner portion 157 that extends into knife gate slot 104 to guide knife gate 110 and to fill the gap between knife gate and the walls of the knife gate slot.

Knife gate seat 120 is disposed in the groove 105 and extends into the stuffing box 108. In this embodiment, knife gate seat 120 is a "U" shaped elastomeric seat, having an arcuate portion conforming to the bottom of the flow channel 102 and the knife gate 110 and further having approximately parallel sides conforming to opposing faces of knife gate slot 104. The ends of the parallel sides extend up through the stuffing box 108 and are clamped in place by packing retainer 160. When knife gate 110 is in its closed position, its outer edge seats tightly against the knife gate seat 120 to form a pressure tight seal and prevent fluid or media leakage through flow channel 102. The knife gate seat 120 is, in effect, a u-shaped seal.

Knife gate 110 is slideable between an open position where it is retracted and out of the flow channel 102 (see FIG. 1), and a closed position where it extends across flow channel 102 and is seated in the "U" shaped seat 120 to prevent fluid or media flow through the channel (see FIG. 2). Knife gate 110 may be connected to an actuator or other means (not shown) for effecting movement between the open and closed position. Knife gate 110 has an arcuate end conforming to the shape of the bottom of the groove 105 and the seat 120 and sides conforming to opposing faces of knife gate opening 104 and the parallel sides of the seal. In its closed position knife gate 110 forms a pressure tight seal with knife gate seat 120 around the arcuate portion of that seal. This pressure tight seal is effected by the contact pressure between the edge of knife gate 110 and knife gate seat 120. Knife gate 110 remains in sliding sealed engagement with stuffing box seal 150 over its full range of motion between the open and the closed positions.

A port liner gate guide 170 is disposed at each end of flow channel 102. Each port liner gate guide 170 is a generally cylindrical ring extending into the flow channel from each of the outer ends thereof to prevent lateral motion of knife gate 110 due to pressure and flow from fluid or media in the flow channel 102 when the knife gate 110 is closing or is in its closed position. Each ring 170 is formed, at its outer end, with a flange 172 that abuts the valve body at the open end of the flow channel 102 to locate the ring therein.

As best seen in FIG. 2, the cylindrical wall of each ring 170 extends inwardly from its outer end in engagement with the wall of the cylindrical portion 101 that bounds the flow channel 102. At its inner end, that is, the end adjacent the groove 105, each ring 170 is formed with an annular rib 174 that projects inwardly so that the ribs on each ring extend toward each other and the knife gate 110. The adjacent faces of the ribs 174, 174 are spaced apart a distance just slightly greater than the thickness of the knife gage 110 to guide the knife gate as it moves between its open and closed positions and to significantly reduce its lateral movement in its closed position under flow conditions. By minimizing lateral movement the effectiveness of the knife gate seat 120 and the stuffing box seal 150 is enhanced.

Still referring to FIG. 2 the radial wall 176 that extends between the cylindrical wall of the port liner guide and the rib 174 is at a slight angle and overhangs the U-seal 120 in bearing engagement therewith. With this arrangement the radial wall 176 seats on the u-shaped seat 120 and holds it in place in the valve body.

Injectable packing 152 may be replenished by injecting additional injectable packing through injection ports 106 without any disassembly of the valve and while the it remains in position in its associated system. Similarly, stuffing box seal 150 may be repaired or replaced by removing the packing retainer 160 without removing the valve from its associated system.

Moreover, removal of the knife gate 110 provides access to the knife gate seat 120 so that it too can be serviced without removing the valve body 100 from the system. If, however, the knife gate seat is being replaced, one end of the valve must be disassembled from the associated system to facilitate access.

Although illustrated and described above with reference to certain specific embodiments, the present invention is nevertheless not intended to be limited to the details shown. Rather, various modifications may be made within the scope and range of equivalents of the claims and without departing from the spirit of the invention.

What is claimed:

1. A knife gate valve, comprising:
   a unitary valve body formed with a flow channel extending therethrough, a knife gate slot that communicates with the flow channel, a stuffing box adjacent the knife gate slot and communicating therewith and, an injection port communicating with the stuffing box;
   a knife gate slideably carried in the knife gate slot and the stuffing box for movement between an open position and a closed position extending across and closing the flow channel;
   a stuffing box seal carried in the stuffing box including injectable sealing material injectable through said injection port, the stuffing box seal comprising lateral seals disposed in said stuffing box, the lateral seals engaging the knife gate and configured to contain the injectable sealing material.

2. The valve of claim 1 wherein the lateral seals comprise a concave surface facing the transverse walls of the stuffing box defining with said walls a concavity communicating with the injection ports and containing the injectable sealing material.

3. A knife gate valve, comprising:
a unitary valve body formed with a flow channel extending therethrough, a knife gate slot that communicates with the flow channel, a stuffing box adjacent the knife gate slot and communicating therewith and, an injection port communicating with the stuffing box;
a knife gate slideably carried in the knife gate slot and the stuffing box for movement between an open position and a closed position extending across and closing the flow channel;
a stuffing box seal carried in the stuffing box including injectable sealing material injectable through said injection port,
the unitary valve body comprising a generally cylindrical portion including the flow channel and having a groove formed therein communicating with the knife gate slot, the valve body further comprises a box portion extending from the outer periphery of the cylindrical portion, the box portion including the knife gate slot, the stuffing box and injection port;
the stuffing box being formed by a pair of walls transverse to the axial direction of the flow channel and the stuffing box seal comprising a pair of lateral seals carried in the stuffing box one on each side of and in sealing engagement with the knife gate;
each lateral seal having a concave surface facing a transverse wall forming the stuffing box, the concave surface defining with its adjacent transverse wall a concavity in communication with an injection port and the injectable sealing material is located in each concavity in sealing engagement with the transverse walls forming the stuffing box.

4. A knife gate valve in accordance with claim 3 wherein the valve body includes a knife gate seat in the form of a U-shaped seal having an arcuate portion conforming to the bottom of the flow channel and essentially parallel ends conforming to opposing faces forming the knife gate slot and wherein the parallel ends terminate in said stuffing box.

5. A knife gate valve comprising a unitary valve body formed with a flow channel extending therethrough, a groove formed in and communicating with the flow channel and a knife gate seat carried in the groove, a knife gate carried in the valve body for movement between an open position wherein fluid flow through the flow channel and a closed position wherein the knife gate seals against the seat and prevents fluid flow through the flow channel, and a pair of port liner guides carried by the valve body and located in the flow channel, each guide including a generally cylindrical wall that extends inwardly from an open end of the flow channel to the groove, the cylindrical wall of each guide being formed with a flange adjacent the open end of the flow channel in engagement with the value body, each of the cylindrical walls being formed with a rib at its inner end adjacent the knife gate, each rib having a reduced thickness relative to the cylindrical wall, the space between the ribs being a distance just slightly larger than the thickness of the knife gate so that the ribs guide the movement of the knife gate as it moves between its open and closed positions and minimize movement of the knife gate under flow conditions when the knife gate is in its closed position.

6. A knife gate valve in accordance with claim 5, wherein the port liner guides engage the seat to retain it in the valve body.

7. A knife gate valve, comprising:
a valve body formed with a flow channel extending therethrough, a knife gate slot that communicates with the flow channel, a stuffing box adjacent the knife gate slot and communicating therewith and, an injection port communicating with the stuffing box;
a knife gate slideably carried in the knife gate slot and the stuffing box for movement between an open position and a closed position extending across and closing the flow channel;
a stuffing box seal carried in the stuffing box including injectable sealing material injectable through said injection port, the stuffing box seal comprising lateral seals disposed in
said stuffing box, the lateral seals engaging the knife gate and configured to contain the injectable sealing material.

8. The valve of claim 1 wherein the lateral seals comprise a concave surface facing the transverse walls of the stuffing box defining with said walls a concavity communicating with the injection ports and containing the injectable sealing material.

9. A knife gate valve, comprising:
a valve body formed with a flow channel extending therethrough, a knife gate slot that communicates with the flow channel, a stuffing box adjacent the knife gate slot and communicating therewith and, an injection port communicating with the stuffing box;
a knife gate slideably carried in the knife gate slot and the stuffing box for movement between an open position and a closed position extending across and closing the flow channel;
a stuffing box seal carried in the stuffing box including injectable sealing material injectable through said injection port,
the valve body comprising a generally cylindrical portion including the flow channel and having a groove formed therein communicating with the knife gate slot, the valve body further comprising a box portion extending from the outer periphery of the cylindrical portion, the box portion including the knife gate slot, the stuffing box and injection port;
the stuffing box being formed by a pair of walls transverse to the axial direction of the flow channel and the stuffing box seal comprising a pair of lateral seals carried in the stuffing box one on each side of and in sealing engagement with the knife gate;
each lateral seal having a concave surface facing a transverse wall forming the stuffing box, the concave surface defining with its adjacent transverse wall a concavity in communication with an injection port and the injectable sealing material is located in each concavity in sealing engagement with the transverse walls forming the stuffing box.

10. A knife gate valve in accordance with claim 3 wherein the valve body includes a knife gate seat in the form of a U-shaped seal having an arcuate portion conforming to the bottom of the flow channel and essentially parallel ends conforming to opposing faces forming the knife gate slot and wherein the parallel ends terminate in said stuffing box.

* * * * *